United States Patent
Lai et al.

[19]

[11] Patent Number: 6,166,103

[45] Date of Patent: Dec. 26, 2000

[54] AQUEOUS GELABLE COMPOSITIONS WITH DELAYED GELLING TIMES

[75] Inventors: Quintin J. Lai, Anchorage, Ak.; E. Mark Scott, Plano, Tex.

[73] Assignee: Atlantic Richfield Company, Chicago, Ill.

[21] Appl. No.: 09/217,757

[22] Filed: Dec. 21, 1998

[51] Int. Cl.$^7$ .................................................. C09K 7/02
[52] U.S. Cl. .......................... 523/130; 524/407; 524/239
[58] Field of Search .................................. 523/130, 132; 524/407, 503, 521, 239

[56] References Cited

U.S. PATENT DOCUMENTS

| | | | |
|---|---|---|---|
| 2,842,205 | 7/1958 | Allen et al. | 166/21 |
| 2,968,572 | 1/1961 | Peeler | 106/74 |
| 3,306,756 | 2/1967 | Miller | 106/84 |
| 3,306,758 | 2/1967 | Miller | 106/84 |
| 3,449,139 | 6/1969 | Kuhn | 106/84 |
| 4,293,340 | 10/1981 | Metz | 106/74 |
| 4,354,874 | 10/1982 | Vickers | 106/74 |
| 4,354,875 | 10/1982 | Powers et al. | 106/74 |
| 4,384,894 | 5/1983 | Vickers et al. | 106/80 |
| 4,683,949 | 8/1987 | Sydansk et al. | 166/270 |
| 4,724,906 | 2/1988 | Sydansk | 166/295 |
| 4,730,675 | 3/1988 | Wygant et al. | 166/295 |
| 4,744,418 | 5/1988 | Sydansk | 166/270 |
| 4,770,245 | 9/1988 | Sydansk | 166/295 |
| 4,968,442 | 11/1990 | Falk | 252/8.551 |
| 4,986,356 | 1/1991 | Lockhart et al. | 166/300 |
| 5,002,431 | 3/1991 | Heymans et al. | 405/128 |
| 5,010,954 | 4/1991 | Falk | 166/295 |
| 5,028,344 | 7/1991 | Hoskin | 252/8.554 |
| 5,048,609 | 9/1991 | Tackett, Jr. et al. | 166/295 |
| 5,082,057 | 1/1992 | Sydansk | 166/295 |
| 5,219,475 | 6/1993 | Lockhart et al. | 252/8.551 |
| 5,256,315 | 10/1993 | Lockhart et al. | 252/8.551 |
| 5,314,019 | 5/1994 | Honarpour | 166/270 |
| 5,338,465 | 8/1994 | Lockhart et al. | 252/8.551 |
| 5,377,760 | 1/1995 | Merrill | 166/295 |
| 5,404,951 | 4/1995 | Lai et al. | 166/295 |
| 5,418,217 | 5/1995 | Hutchins et al. | 507/222 |
| 5,478,802 | 12/1995 | Moradi-Araghi | 507/203 |
| 5,642,783 | 7/1997 | Moradi-Araghi et al. | 166/295 |
| 5,762,141 | 6/1998 | Hutchins et al. | 166/295 |

OTHER PUBLICATIONS

SPE/DOE 17329 "A New Conformance–Improvement–Treatment Chromium (III) Gel Technology", by R. D. Sydansk; Society of Petroleum Engineers, Inc./U.S. Department of Energy, Apr. 20, 1998.

*Primary Examiner*—Edward J. Cain
*Assistant Examiner*—Katarzyna Wyrozebski
*Attorney, Agent, or Firm*—Robert E. Sloat; F. Lindsey Scott

[57] ABSTRACT

An aqueous gelable composition containing an organic, water soluble polymer cross-linkable with a multivalent cation and a retarded cross-linking system consisting essentially of chromium trichloride and monosodium glutamate and a method for reducing the permeability of the subterranean formation using the composition.

20 Claims, No Drawings

AQUEOUS GELABLE COMPOSITIONS WITH DELAYED GELLING TIMES

FIELD OF THE INVENTION

This invention relates to an aqueous gelable composition containing an organic water-soluble polymer having a delayed gelling time which is variable within wide time and temperature ranges. Such aqueous gelable compositions are useful to modify the permeability of high permeability regions in petroleum reservoirs. The invention also relates to a process for reducing the permeability of a reservoir using the gelable composition.

BACKGROUND OF THE INVENTION

It is well known in the petroleum industry that, at the end of primary production of oil from a subterranean formation, secondary and tertiary recovery methods may be used. Primary production refers to the production of oil by simply flowing oil (possibly in mixture with water, gas or both) from the formation through a suitable tubing in a well under formation pressure or pumping the oil from the formation. In primary production, the oil flows from the formation into the wellbore for recovery under formation pressure. Secondary and tertiary recovery relate to the use of various techniques for causing the oil to flow from the formation into the well at a suitable rate. Such techniques involve water flooding, gas flooding, miscible gas flooding and the like, as well known to those skilled in the art. In general, such techniques involve the passage of a substance such as water, steam, carbon dioxide, light hydrocarbon gases containing from 1 to 5 carbon atoms, nitrogen, mixtures thereof and the like, from a first injection well or wells through the subterranean formation to a production well or wells to cause the oil to move into the production well or wells for recovery, generally with the injected fluid.

A problem in such processes is the existence or development of high permeability zones in the formations between the injection wells and the production wells through which the bulk of the injected material flows. Initially, this flow pushes the oil found in the high permeability zones to the recovery wells. Subsequently, the injected material simply bypasses the less permeable portions of the formation and flows directly to the recovery wells through the high permeability zones. In such operations, it is desirable to plug or otherwise restrict the high permeability zones. The restriction of flow through the high permeability zones results in causing the injected fluid to pass through the lower permeability zones, and to push oil from those zones the recovery wells.

One technique used to block the high permeability zones is the use of gelable compositions which are injected into the formation and allowed to set in the high permeability zones. One suitable gelable composition which is widely used is an aqueous solution of polyacrylamide. The polyacrylamides are caused to gel by mixture with a multivalent metal cation such as trivalent chrome. It is well known in the art that such mixtures must be retarded to prevent premature gellation of the polyacrylamide with the multivalent metal cation at typical oil reservoir temperatures. Other polyvalent ions may also be used but trivalent chrome is a widely used multivalent cation.

Previously, it has been considered necessary to produce chrome ligands for use in combination with a second ligand as disclosed, for instance, in U.S. Pat. No. 5,338,465, "Aqueous Gelable Composition With Delayed Gelling Time", issued Aug. 16, 1994 to Thomas P. Lockhart and Paola Albonico. The use of these materials requires that the first organic ligand be prepared and transported to the well, and that the second ligand be transported to the well. These materials are frequently solutions and their transportation to wells in remote locations can constitute a substantial expense.

Since it is necessary that the gellation of the polyacrylamides with multivalent cations be inhibited to permit the injection of the getable composition into the zone of interest, alternative methods have been sought for accomplishing this objective without the use of the relatively expensive, and more difficultly handled, ligand solutions.

SUMMARY OF THE INVENTION

According to the present invention, an aqueous gelable composition containing an organic water-soluble polymer crosslinkable with a multivalent metal cation and a retarded crosslinking system consisting essentially of a multivalent cation and monosodium glutamate (MSG) is disclosed.

A method for using this composition to reduce the permeability of a subterranean formation is also disclosed.

DESCRIPTION OF THE PREFERRED EMBODIMENTS

According to the present invention a retarded crosslinking system is provided and consists essentially of a multivalent cation such as trivalent chrome, aluminum, iron, zirconium, titanium and the like, in combination with MSG. The rate of retardation is readily varied by varying at least one of the following concentrations: the amount of water-soluble polymer, the amount of multivalent ion present, and the amount of MSG present. The concentrations and ratios of these materials can be varied over wide ranges to produce widely varied gellation times in formations at temperatures up to at least about 200° F. Unless otherwise stated, references to chrome ions are representative of multivalent ions which may be trivalent chrome, aluminum, zirconium, titanium, or the like.

The water-soluble organic polymers which can be crosslinked with chrome ion useful for the purposes of the present invention are generally selected from the group consisting of acrylamide polymers. In particular, there can be used either acrylamide homopolymers or acrylamide copolymers with one or more copolymerizable unsaturated monomers such as acrylic acid, methacrylamide, sodium 2-acrylamido-2-mtthyl-propane-sulfonate and N-vinyl-2-pyrrolidone and the like. Of the copolymers, the copolymers of acrylamide with sodium 2-acrylamido-2-methyl-propane-sulfonate, the copolymers of acrylamide with N-vinyl-2-pyrrolidone and the terlpolymers of acrylamicle with sodium 2-acrylamido-2-methyl-propane-sulfonate and N-vinyl-2-pyrrolidone are preferred. Such polymers are disclosed in U.S. Pat. No. 5,338,465 "Aqueous Gelable Composition With Delayed Gelling Time", issued Aug. 16, 1994 to Thomas P. Lockhart and Paola Albonico. This patent is hereby incorporated in its entirety by reference.

The acrylamide polymers and copolymers can be either substantially non-hydrolyzed (i.e. less than 0.1 percent of the amidic groups hydrolyzed into free carboxyl groups) or partially hydrolyzed (i.e. more than 0.1 percent of amidic groups hydrolyzed into free carboxyl groups). Hydrolyzation ranges up to 50% may be used.

The molecular weight of the acrylamide polymers or acrylamide copolymers may be within a range from about 100,000 to about 20,000,000 and preferably within a range of about 200,000 to about 12,000,000.

The concentration of the acrylamide polymer or copolymer in the getable composition can vary from about 1,000 to about 80,000 parts per million by weight (ppmw) and preferably will be within a range from about 3,000 to about 50,000 ppmw. In a preferred range, the concentration will be from about 5,000 to about 10,000 ppmw with fresh water and from about 10,000 to about 30,000 ppmw when saltwater or seawater is used.

The amount of MSG used is the amount necessary to achieve the desired retarding. The amount required is a function of the concentration of polymer in the aqueous gelable composition, and the weight ratio of polymeric material to chrome ion in the aqueous gelable composition. The ratio is desirably from about 40 to about 100. The amount of MSG required to achieve a desired retardation is generally greater with lower ratio gelable compositions. Typically, the MSG is present in the gelable solution in an amount equal to from about 1000 to about 80,000 ppmw.

Generally, the multivalent cation is present in a range from about 40 to about 12,000 ppmw.

The gelable composition may also contain one or more stabilizer agents for the polymer as known to those skilled in the art such as, for instance, thiourea and the like. Further the gelable composition, according to the present invention will have a pH value within the gellation range for the composition. This pH value can vary from about 2 to about 9 and preferably is from about 4 to about 7. The value may be varied as desire by the addition of a mineral acid or base as required. For instance, commonly used mineral acids such as hydrochloric acid and commonly used mineral bases such as sodium hydroxide may be used.

The gelable composition of the present invention may be formed by blending the dry polymer, dry MSG and dry chrome in the form of chromium chloride or other inorganic chrome salts, and mixing to form the aqueous gelable composition. The composition can be retarded to have a desired gelling time. The water used in the composition may be freshwater, brine from the formation or another source, seawater or the like.

For example, a 5 weight percent aqueous solution of polymer may be prepared by the following procedure. 25 g of partially hydrolyzed polyacrylamide having a molecular weight of about 400,000 was mixed in 475 g de-ionized water. The polymer was thoroughly dispersed, then placed in a jar and agitated gently overnight to facilitate complete hydration. This yields 1.5 g of polymer in each 30 ml aliquot. A 40:1 polymer:$Cr^{+++}$ ratio requires 0.0375 g $CrCl_3$. $CrCl_3$ stock solution (50% solution) is prepared as follows. Dissolve 100 g of $CrCl_3$ in 100 ml $H_2O$ (density=1.4 g/ml). Use 54 ml (microliters) per 30 ml aliquot for a 40:1 polymer:$Cr^{+++}$ ratio. 36 ml is required for a 60:1 polymer:$Cr^{+++}$ ratio. This is a laboratory preparation procedure. Field operations will vary.

According to the present invention, the gelable composition may be used to reduce the permeability of high-permeability zones in a subterranean formation by injecting the aqueous gelable composition into the formation and retaining at least a portion of the aqueous gelable composition in the formation in the high-permeability areas for a period of time sufficient for the water-soluble polymer to gel, thereby reducing the permeability of the high-permeability areas. The use of the gelable composition thus makes it possible to reduce the permeability of high permeability regions situated either in the near wellbore portions of the formation or deep in the formation, depending upon the quantity of the gelable composition injected.

As known to those skilled in the art, over flushes may be used to modify the permeability of the gel-filled formation. The gels can be used to treat many different geological structures including high permeability zones within the formation matrix and anomalies external to the matrix such as fractures and other cavities. The gels are relatively insensitive to the stratigraphy of the rock and can be employed in carbonate and sandstone strata and unconsolidated or consolidated strata having varying mineralogy. Once the gels are in place, it is difficult to displace the gels by physical or chemical means other than the total destruction of the crosslinked networks. The gels may be reversible on contact with hydrogen peroxide or sodium hypochlorite, as known to the art, but are substantially insoluble in formation fluids.

In the following examples, the gellation is reported by gellation evaluation ratings as follows:

| GELLATION EVALUATION RATINGS | |
|---|---|
| A | No viscosification (no change) |
| b | Slight viscosification |
| B | Viscosification but not coherent gellation |
| C | Flowing gel - no tongue |
| D | "Tonguing" gel |
| E | Solid gel - no tongue, no ringing |
| F | Ringing gel |
| Syn | Syneresis |

EXAMPLE 1

A gelable composition was prepared by mixing 115 grams of a partially hydrolyzed polyacrylamide having a molecular weight of about 400,000 with 30 ml of deionized water. 0.0375 grams of chrome chloride ($CrCl_3$) in 30 ml of de-ionized water was added to produce the gelable composition. The chrome ion is present in a polymer to chrome ion weight ratio of 40:1. A quantity of the gelable composition was then placed in an oven at 200° F. and the gellation delay observed at the intervals shown for up to 96 hours. Varying quantities of MSG were then mixed with additional quantities of the gelable composition, as shown, and placed in an oven at 200° F. and observed at regular intervals for up to 96 hours. It will be observed that, by the use of MSG, the gellation of the gelable composition has been significantly retarded. In fact, it is noteworthy that with 64,000 ppmw of MSG, little gellation is observed for at least 3 hours. The MSG was purchased as ACCENT, a food flavor enhancer. ACCENT is a trademark of Pillsbury Specialty Company, Minneapolis, Minn., for monosodiumglutamate. This MSG was used for all examples unless otherwise stated.

TABLE 1

| MSG ppmw | 1 hr | 1.5 hr | 2 hr | 3 hr | 4 hr | 5 hr | 6 hr | 24 hr | 96 hr |
|---|---|---|---|---|---|---|---|---|---|
| 0 | F | F | F | F | F | F | F | F | F |
| 16,000 | F | F | F | F | F | F | F | F | F |
| 24,000 | F | F | F | F | F | F | F | F | F |
| 32,000 | E | E | E–F | E–F | F | F | F | F | F |
| 40,000 | D | D–E | E | E | E | E | E | F | F |
| 48,000 | B | B–C | B–C | C | C | D | D | F | F |
| 56,000 | b | b | b | B | B | B | B | E–F | F |
| 64,000 | A | A | A | b | B | B | B | E | F |

EXAMPLE 2

In Example 2, a similar procedure was used with the gelable composition being the composition as used in Example 1, except that 0.025 grams of chrome chloride (CrCl$_3$) in 30 ml of de-ionized water was used. The chrome ion is present in a weight ratio of polymer to chrome ion of 60:1. Quantities of the gelable solution were tested as shown below in Table II. It is again noted that substantial retardation of the gelling time is achieved by use of the MSG.

TABLE 2

| MSG ppmw | 0.5 hr | 1 hr | 2 hr | 3 hr | 4 hr | 6 hr | 7 hr | 8 hr | 24 hr | 72 hr |
|---|---|---|---|---|---|---|---|---|---|---|
| 0 | F | F | F | F | F | F | F | F | F | syn |
| 16,000 | F | F | F | F | F | F | F | F | F | syn |
| 32,000 | F | F | F | F | F | F | F | F | F | syn |
| 64,000 | C | D | D | D | D | D | D | E | F | syn |
| 80,000 | A | A | b | B | B–C | C | C | C–D | F | F |
| 90,000 | A | A | A | A | A | B | B | B | F | F |

EXAMPLE 3

A gelable composition was prepared by mixing 30 ml of the polymer solution used in Example 1 with 0.015 grams of chrome chloride (CrCl$_3$) and 30 ml of de-ionized water. The chrome is present in a polymer to chrome ion weight ratio of 100:1. Quantities of the material were tested by mixing the quantities of MSG shown with samples of the gelable composition. These samples were then placed in an often at 200° F. and the gellation observed at various times. The test results are shown in Table 3.

TABLE 3

| MSG | 0.5 hr | 1 hr | 2 hr | 3 hr | 4 hr | 5 hr | 6 hr | 24 hr | 72 hr |
|---|---|---|---|---|---|---|---|---|---|
| 0 | F | F | F | F | F | F | F | F | F |
| 16,000 | C | C | C–D | D | D | D | D–E | E–F | F |
| 32,000 | A | B | B | B | B | B | B | C | E |
| 48,000 | A | A | B | B | B | B | B | B | B |
| 64,000 | A | A | A | A | A | b | b | b | b |
| 80,000 | A | A | A | A | A | A | A | A | A |
| 96,000 | A | A | A | A | A | A | A | A | A |

EXAMPLE 4

A gelable composition was prepared by mixing 30 ml of the polymer solution of Example 1 with 30 ml of de-ionized water. Chrome chloride (CrCl$_3$) was then mixed with quantities of the gelable composition in varying amounts to produce gelable compositions containing chrome ion at polymer to chrome ion weight ratios of 80:1, 90:1 and 100:1. Portions of these solutions were then mixed with various quantities of MSG to produce retarded gelable compositions. The retarded gelable compositions were tested by placing them in an oven at 200° F. for 72 hours. The gellation properties are reported below in Table 4.

TABLE 4

| Ratio | MSG ppmw | 0.5 hr | 1 hr | 2 hr | 3 hr | 4 hr | 5 hr | 6 hr | 7 hr | 24 hr | 72 hr |
|---|---|---|---|---|---|---|---|---|---|---|---|
| 80:1 | 0 | F | F | F | F | F | F | F | F | F | F |
| 80:1 | 16,000 | D | D | D–E | E | E | E | E | E | F | F |
| 80:1 | 32,000 | B | B | B | B | B | B | B | B | E | F |
| 80:1 | 48,000 | A | A | A | A | b | b | b | b | B | E |
| 80:1 | 64,000 | A | A | A | A | A | A | A | A | b | B |
| 80:1 | 80,000 | A | A | A | A | A | A | A | A | A | A |
| 80:1 | 96,000 | A | A | A | A | A | A | A | A | A | A |

TABLE 4-continued

| Ratio | MSG ppmw | 0.5 hr | 1 hr | 2 hr | 3 hr | 4 hr | 5 hr | 6 hr | 7 hr | 24 hr | 72 hr |
|---|---|---|---|---|---|---|---|---|---|---|---|
| 90:1 | 16,000 | D | D | D | D–E | E | E | E | E | F | F |
| 90:1 | 32,000 | b | B | B | B | B | B | B | B | D | E–F |
| 90:1 | 48,000 | A | A | A | A | A | A | A | A | B | D |
| 90:1 | 64,000 | A | A | A | A | A | A | A | A | A | B |
| 90:1 | 80,000 | A | A | A | A | A | A | A | A | A | A |
| 100:1 | 12,800 | D | D | D | E | E | E | E | E | F | F |
| 100:1 | 22,400 | b | B | B | B | B | B | B–C | B–C | E | F |
| 100:1 | 38,400 | A | A | A | b | b | b | b | b | B–C | E |

Additional tests were performed using a gelable solution produced by mixing 1.5 g of the polymer solution of Example 1 with 0.020 g of chrome chloride (CrCl$_3$) in 30 ml of de-ionized water. The polymer/chrome ion weight ratio was 75:1. MSG was added to portions of this gelable composition in the amounts shown and tested for 72 hours in an oven at 200° F. In some of the tests, reagent grade MSG was used. In the other tests, the MSG used was ACCENT Food Enhancer, which is a commercially available MSG product. The test results are shown below in Table 5.

TABLE 5

| MSG | ppmw | 0.5 hr | 1 hr | 2 hr | 3 hr | 4 hr | 5 hr | 6 hr | 7 hr | 24 hr | 72 hr |
|---|---|---|---|---|---|---|---|---|---|---|---|
| 0 | 0 | F | F | F | F | F | F | F | F | F | F |
| 0.5 | 16,000 | E | E | E | E | E | E | E | E | F | F |
| 0.6 | 19,200 | D | D | D | E | E | E | E | E | F | F |
| 0.7 | 22,400 | C | C | C | C–D | D | D | D–E | E | F | F |
| 0.8 | 25,600 | B–C | B–C | B–C | B–C | B–C | C | C | C | E–F | F |
| 0.9 | 28,800 | B | B | B | B | B | B | B | C | E | F |
| 1.0 | 32,000 | b | b | b | b | b | b | B | B–C | E | F |
| 1.1 | 35,200 | A | A | A | A | A | A | A | b | E | F |
| 1.2 | 38,400 | A | A | A | A | A | A | A | A | D | F |
| 1.3 | 41,600 | A | A | A | A | A | A | A | A | C | F |
| 1.4 | 44,800 | A | A | A | A | A | A | A | A | B | F |
| 1.5 | 48,000 | A | A | A | A | A | A | A | A | B | F |
| 0.7* | 22,400 | C | C | C | C–D | D | D | D–E | E | F | F |
| 1.0* | 32,000 | b | b | B | B | B | B | B | B–C | E | F |
| 1.2* | 38,400 | A | A | A | A | A | A | A | A | D | F |
| 1.5* | 48,000 | A | A | A | A | A | A | A | A | B | F |

*reagent grade MSG

Upon a review of the forgoing examples, it is clear that by varying one or more of the amount of polymer in the gelable composition, the amount of chrome ion in the gelable composition and the amount of MSG in the gelable composition, gellation of the composition may be retarded to any desired extent.

By the present invention MSG, which is a readily available commercial material which is available in dry form, is used. The chrome chloride is also available in solid form and is readily obtained in this form. Similarly, the polyacrylamickes used are available in dry form and are commercially available. These materials may be readily transported to a well site in dry form where water is typically available for use to form the gelable composition for use in reducing the permeability of high-permeability zones of the formation. The use of the method and composition of the present invention results in a more economical and more convenient method for using water-soluble polymer compositions to reduce the permeability of high-permeability portions of the formation. The present invention requires no tailored chrome ligand compositions, nor does it require the adjustment of a chrome ligand composition/complimentary ligand blend. By the adjustment of the MSG content, the polymer content and the chrome ion content of the solution, the gel retardation can be controlled as desired. The present invention provides a much more easily used and more economical method and composition for reducing and controlling the permeability of high-permeability zones in a subterranean formation.

Having thus described the invention by reference to certain of its preferred embodiments, it is respectfully pointed out that the embodiments described are illustrative rather than limiting in nature and that many variations and modifications are possible within the scope of the present invention.

Having thus described the invention, we claim:

1. An aqueous gelable composition containing an organic water-soluble polyner crosslinkable with a multivalent cation and a retarded crosslinking system consisting essentially of chromium trichloride and monosodium glutamate.

2. The composition of claim 1 wherein the chromium trichloride is present in an amount equal to from about 40 to about 12,000 ppmw.

3. The composition of claim 1 wherein the monosodium glutamate is present in an amount equal to from about 1,000 to about 80,000 ppmw.

4. The composition of claim 1 wherein the concentration of the water-soluble polymer is from about 1000 to about 80,000 ppm.

5. The composition of claim 1 wherein the water in the aqueous gelable composition is fresh water and the concentration of the water-soluble polymer is from about 5000 to about 10,000 ppm.

6. The composition of claim 1 wherein the water in the aqueous gelable composition is seawater and the concentration of the water-soluble polymer is from about 10,000 to about 30,000 ppm.

7. The composition of claim 1 wherein the water-soluble organic polyme is selected from the group consisting of acrylamide homopolymers and acrylamide copolymers with one or more copolymerisable unsaturated monomer(s) selected from the group consisting of acrylic acid, methacrylanide, sodium 2-acrylamido-2-methy-propane-sulfonate and N-vinyl-2-pyrrolidone, which acrylamide homopolymers copolymers have a molecular weight of from about 100,000 to about 20,000,000 the acrylamide homopolymers and copolymers having less than 1% of their amidic groups hydrolyzed into free carboxyl groups of partially hydrolyzed and having more than 1% of amidic groups but not all of the amidic groups hydrolyzed into free carboxyl groups.

8. The composition of claim 7 wherein the acrylamide copolymers are copolymers of acrylamide with sodium 2-acrylamido-2-methyl-propane-sulfonate, the copolymers of acrylamide with N-vinyl-pyrrolidone and the terpolymers of acrylamide with sodium 2-acrylamido-2-methyl-propane-sulfonate and N-vinyl-2-pyrrolidone.

9. The composition of claim 7 wherein the molecular weight of the acrylamide homopolymer or copolymer is 200,000–12,000,000.

10. The composition of claim 1 wherein the pH of the composition is from about 2 to about 9.

11. The composition of claim 1 wherein the pH of the composition is from about 4 to about 7.

12. The composition of claim 1 wherein the composition includes at least one stabilizer for the water-soluble polymer.

13. A method for reducing the permeability of a subterranean formation, the process consisting essentially of:

a) injecting an aqueous gelable composition containing an organic water-soluble polymer crosslinkable with chromium ion and a retarded crosslinking system consisting essentially of chromium trichloride and monosodium glutamate into the subterranean formation through a well penetrating the subterranean formation in an amount sufficient to at least partially fill high-permeability areas around the well; and b) retaining at least a portion of the composition in place in the high-permeability areas for a period of time sufficient for the water-soluble polymer to gel and reduce the permeability of the high-permeability areas.

14. The method of claim 13 wherein the chromium trichloride is present in an amount equal to from about 40 to about 12,000 ppmnw.

15. The method of claim 13 wherein the monosodium glutamate is present in an amount equal to from about 1,000 to about 80,00 ppmw.

16. The method of claim 13 wherein the water-soluble polymer is present in a concentration from about 1000 to about 80,000 ppm.

17. The method of claim 13 wherein the water in the aqueous gelable composition is fresh water and the concentration of the water-soluble polymer is from about 5000 to about 10,000 ppm.

18. The method of claim 13 wherein the water in the aqueous gelable composition is seawater and the concentration of the water-soluble polymer is from about 10,000 to about 30,000 ppm.

19. The method of claim 13 wherein the pH of the composition is from about 2 to about 9.

20. The method of claim 13 wherein the composition includes at least one stabilizer for the water-soluble polymer.

* * * * *